United States Patent
Thomas, Jr.

(10) Patent No.: US 9,475,449 B2
(45) Date of Patent: Oct. 25, 2016

(54) HEADLINER ASSEMBLIES HAVING TETHERED SUPPORT STRUCTURE

(71) Applicant: Toyota Motor Engineering & Manufacturing North America, Inc., Erlanger, KY (US)

(72) Inventor: James M. Thomas, Jr., Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/581,366

(22) Filed: Dec. 23, 2014

(65) Prior Publication Data

US 2016/0176378 A1 Jun. 23, 2016

(51) Int. Cl.
*B60R 21/216* (2011.01)
*B60R 21/213* (2011.01)
*B60R 13/02* (2006.01)
*B60R 21/231* (2011.01)
*B60R 21/232* (2011.01)

(52) U.S. Cl.
CPC .......... *B60R 21/216* (2013.01); *B60R 13/0212* (2013.01); *B60R 13/0231* (2013.01); *B60R 21/213* (2013.01); *B60R 21/232* (2013.01); *B60R 21/23138* (2013.01); *B60R 2013/0287* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,280,991 A * | 1/1994 | Weiland | ............. | B60R 13/0206 160/DIG. 16 |
| 5,398,960 A * | 3/1995 | Ravenberg | .......... | B60R 21/2171 280/728.2 |
| 5,544,912 A * | 8/1996 | Sommer | ............. | B60R 21/2165 280/728.3 |
| 5,765,862 A * | 6/1998 | Bentley | ................. | B60R 21/216 280/728.2 |
| 6,203,056 B1 * | 3/2001 | Labrie | ..................... | B29C 45/14 280/728.3 |
| 6,394,695 B1 * | 5/2002 | Chausset | ............... | B60R 21/216 248/71 |
| 6,402,188 B1 * | 6/2002 | Pasch | .................... | B60R 21/216 280/728.1 |
| 6,431,585 B1 * | 8/2002 | Rickabus | .............. | B60R 21/215 24/114.05 |
| 6,457,738 B1 * | 10/2002 | Labrie | .................. | B60R 21/216 280/728.3 |

(Continued)

FOREIGN PATENT DOCUMENTS

JP  WO 2009039276 A1 *  3/2009  ........... B60R 21/216
JP  WO 2015079959 A1 *  6/2015  ........... B60R 21/216

*Primary Examiner* — Nicole Verley
(74) *Attorney, Agent, or Firm* — Christopher G. Darrow; Darrow Mustafa PC

(57) ABSTRACT

Headliner assemblies may include multiple support structures operatively connected to portions of a headliner. The support structures may include one or more stiffeners. Assemblies may include a tether configured to engage two portions of the stiffeners. In some examples, a headliner assembly may include a moon roof stiffener and a side rail stiffener with a tether that engages portions of each. The tether may provide retention forces in the event of an airbag deployment or headliner impact to retain portions of the stiffeners that may fracture or break.

20 Claims, 3 Drawing Sheets

(56) References Cited

U.S. PATENT DOCUMENTS

| | | | | |
|---|---|---|---|---|
| 6,719,320 B2 * | 4/2004 | Weissert | B60R 21/216 | 280/728.3 |
| 6,913,280 B2 * | 7/2005 | Dominissini | B60R 21/213 | 280/728.2 |
| 6,955,376 B1 * | 10/2005 | Labrie | B29C 45/14 | 280/728.3 |
| 7,077,449 B2 * | 7/2006 | Tokunaga | B60R 13/0206 | 296/187.05 |
| 7,178,205 B2 * | 2/2007 | Nessel | B60R 13/0206 | 24/289 |
| 7,178,850 B2 * | 2/2007 | Smith | B60R 11/00 | 24/295 |
| 7,290,795 B2 * | 11/2007 | Kawai | B60R 21/215 | 24/297 |
| 7,445,233 B2 | 11/2008 | McKimson | | |
| 7,571,927 B2 | 8/2009 | Purvis et al. | | |
| 7,581,749 B2 * | 9/2009 | Robins | B60R 21/02 | 280/728.2 |
| 7,621,591 B2 * | 11/2009 | Arellano | B60R 13/0231 | 296/214 |
| 7,654,558 B2 * | 2/2010 | Choi | B60R 21/213 | 280/728.2 |
| 7,661,708 B2 * | 2/2010 | Szidzek | B60R 21/213 | 280/743.1 |
| 7,698,788 B2 * | 4/2010 | Hansen | B60R 21/213 | 24/297 |
| 7,717,458 B2 * | 5/2010 | Tsuge | B60R 13/02 | 24/458 |
| 7,976,056 B2 * | 7/2011 | Kirchen | B60R 13/0206 | 280/728.2 |
| 8,128,145 B2 * | 3/2012 | Smith | B60R 11/00 | 296/29 |
| 8,316,514 B2 * | 11/2012 | Sano | B60R 13/02 | 24/289 |
| 8,408,586 B2 * | 4/2013 | Ohmori | B60R 21/213 | 280/728.2 |
| 8,439,393 B2 * | 5/2013 | Glaser | B60R 13/0206 | 280/728.2 |
| 8,480,120 B1 * | 7/2013 | Fukuda | B60R 13/0206 | 24/453 |
| 8,550,494 B2 * | 10/2013 | Ochiai | B60R 21/213 | 280/728.2 |
| 8,602,446 B2 | 12/2013 | Ory et al. | | |
| 8,833,797 B2 * | 9/2014 | Suga | B60R 13/0206 | 280/728.2 |
| 8,844,992 B1 * | 9/2014 | Noga | B60R 13/0206 | 24/289 |
| 8,876,151 B2 * | 11/2014 | Yamamoto | B60R 13/0206 | 280/728.3 |
| 9,132,789 B2 * | 9/2015 | Suzuki | B60R 13/0206 | |
| 2001/0009328 A1 * | 7/2001 | Derrick | B60R 21/216 | 280/743.2 |
| 2006/0220356 A1 | 10/2006 | Baekelandt | | |
| 2006/0237950 A1 * | 10/2006 | Worrell | B60R 21/213 | 280/728.2 |

* cited by examiner

HEADLINER ASSEMBLIES HAVING TETHERED SUPPORT STRUCTURE

BACKGROUND OF THE DISCLOSURE

The present disclosure relates generally to vehicle headliner assemblies, and more particularly, to vehicle headliner assemblies having tethered support structure.

Modern vehicles often include headliner assemblies secured to the roof of the vehicle spanning a portion at the top of a passenger compartment. Headliner assemblies may be produced from a variety of material and into a variety of shapes to provide aesthetic surfaces within the passenger compartment, shield other vehicle components, and provide protection to occupants. Support structure may be included in headliner assemblies that provide localized rigidity that may provide benefits such as reduced headliner sagging after installation, energy absorption, and protection of vehicle components.

Many vehicles also include a variety of inflatable safety devices, such as curtain side airbags (CSA). Such CSA may be mounted to a vehicle near the roof and side connection of a vehicle, and may be configured to tear through or displace portions of a headliner assembly upon deployment. Deploying airbags may exert forces on portions of headliner structure that may cause portions of the structure to fracture or separate from the headliner.

SUMMARY OF THE DISCLOSURE

Disclosed herein are embodiments of headliner assemblies having tethers connecting support structure attached to a headliner. In some embodiments, a headliner assembly may include a headliner, a moon roof stiffener, and a side rail stiffener. A tether may engage portions of the moon roof stiffener and/or the side rail stiffener to aid in retention of portions of the stiffener during air bag deployment or headliner impact.

In one implementation, a headliner assembly may include a headliner configured for attachment to a vehicle interior above a passenger compartment, a first support structure operatively connected to the headliner, and a tether having a first and a second end, the first end operatively connected to the first support structure and the second end configured for engagement with a second support structure.

In another implementation, a headliner assembly may include a headliner configured for attachment to a vehicle interior above a passenger compartment, a curtain side airbag operatively connected to the headliner, a first support structure operatively connected to the headliner, a second support structure operatively connected to the headliner, and a tether having a first and a second end, the first operatively connected to the first support structure and the second end operatively connected to the second support structure.

In yet another implementation, a headliner assembly may include a headliner configured for attachment to a vehicle interior above a passenger compartment having an inner and outer surface, the headliner defining a moon roof aperture. The assembly may further include a curtain side airbag operatively connected to the vehicle near a side of the headliner, a side rail stiffener operatively connected to the headliner, a moon roof stiffener operatively connected to the headliner located between the moon roof aperture and the side rail stiffener, and a tether having a first and a second end, where the first end configured for engagement with a top of a front portion of the side rail stiffener and the second end configured for engagement with an outer side of a rear portion of the moon roof stiffener.

The foregoing features and elements may be combined in various combinations without exclusivity unless expressly indicated otherwise. These features and elements as well as the operation thereof will become more apparent in light of the following description and the accompanying drawings. It should be appreciated, however, that the following description and drawings are intended to be exemplary in natures and non-limiting.

DETAILED DESCRIPTION

Figure 1:
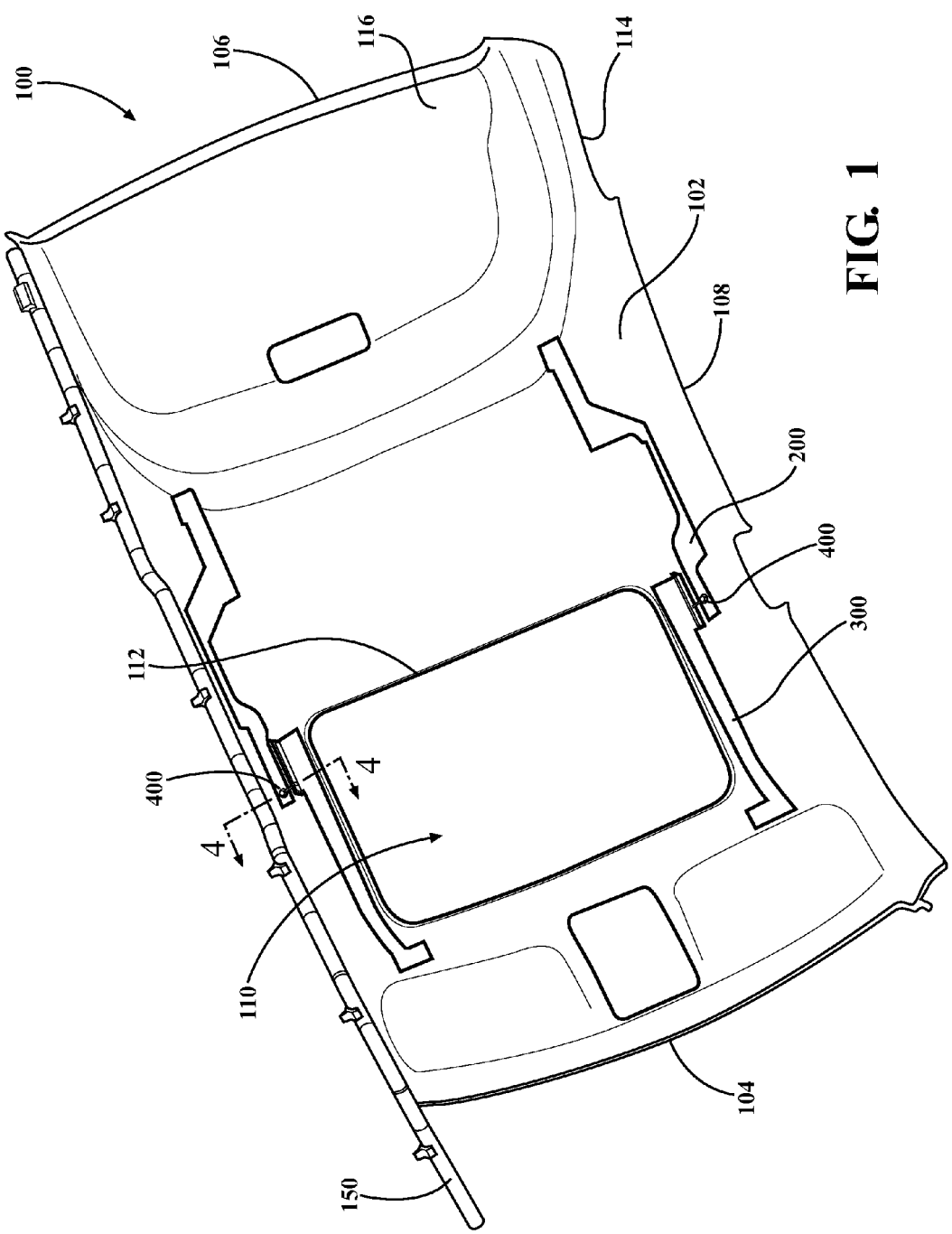
FIG. 1 is perspective view of an exemplary headliner assembly having a curtain side airbag, support structure, and tethers.

This detailed description relates to headliner assemblies having support structure operatively connected to a headliner. In some embodiments, the support structure may include one or more stiffeners attached to the headliner. Included in the assemblies are one or more tethers configured to engage two portions of the support structure. In some examples, a headliner assembly may include a moon roof stiffener and a side rail stiffener with a tether that engages portions of each. The tether may provide forces in the event of an airbag deployment or headliner impact to retain portions of the stiffeners that may fracture or break.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example headliner assembly 100 adapted for installation within a vehicle is shown. As used herein, "headliner" may mean any component or portion of a vehicle that covers an area above a passenger compartment. The term "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport.

As used herein, "support structure" or "stiffener" may mean any component operatively connected to a headliner to increase local rigidity of the assembly, provide energy absorption during an impact, provide attachment surfaces, protect other vehicle components, or otherwise provide additional structure to a headliner assembly. For example, stiffeners may include any structure that extends outward from an outer surface of a headliner. The term "operatively connected," as used throughout this description, may include direct or indirect connections, including connections without direct physical contact.

As shown in FIG. 1, one or more arrangements of headliner assembly 100 may include headliner 102, a curtain side airbag (CSA) 150, and support structure 200/300. In one or more arrangements, support structure 200/300 may include one or more stiffeners. For example, support structure may include a side rail stiffener 200 and a moon roof stiffener 300. It is contemplated, however, that a variety of structures attached to headliner 102 may represent stiffeners for purposes of this disclosure. In some embodiments, a tether 400 is attachable to stiffeners 200 or 300 for retentions of portions of the stiffeners during safety device deployment or headliner impacts.

In some embodiments, headliner 102 is designed to cover at least a portion of a roof assembly of a vehicle above a passenger compartment in an interior of a vehicle. Headliner 102 may include a front 104, a rear 106, and sides 108. In one or more arrangements, headliner 102 may include a moon roof aperture 110 defined by moon roof perimeter 112. Headliner 102 may be described as generally having an inner surface 114 and an outer surface 116. Inner surface 114 may face toward the interior of a vehicle, and portions of inner surface 114 may be visible to occupants of the vehicle. Outer surface 116 may generally face away from the interior of the vehicle, towards roof structure of the vehicle. Outer surface 116 may include structure used to mount or attach headliner 102 to a roof portion of a vehicle.

Figure 4:
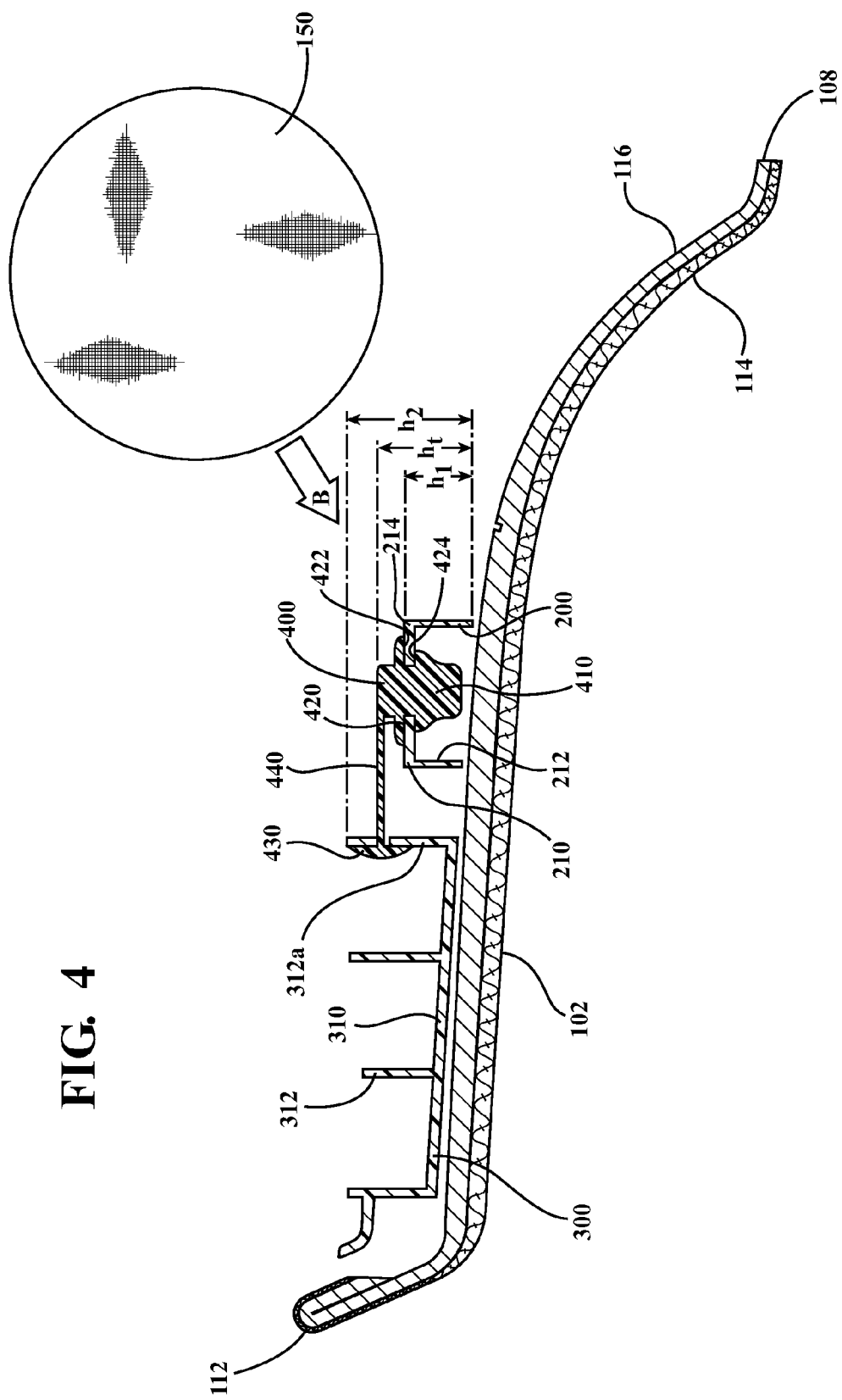
FIG. 4 is an enlarged cross-sectional view taken along section 4-4 of FIG. 1.

As shown in FIGS. 1 and 4, headliner 102 may be manufactured from a variety of materials, and may have two or more distinct layers. For example, headliner 102 may include a substrate layer that includes outer surface 116, and a cover stock layer that includes inner surface 114. In one or more arrangements, the cover stock layer including inner surface 114 may be manufactured from materials designed to provide a finished surface. Decorative materials such as textiles, wood veneer, polymer materials, leather and leather-like materials may be used. For example, the cover stock layer may be made from a foam and fabric material. The substrate layer including outer surface 116 may be manufactured from any desired material providing required structural or attachment properties, such as foam, wood, and polymer materials. Adhesives may be included between layers having different properties.

CSA 150 may be included with headliner assembly 100, either attached to the headliner 102 prior to installation in a vehicle, or adapted to be attached in close proximity to headliner 102 after installation into a vehicle. CSA 150 may represent a variety of inflatable devices that operate in close proximity to headliner 102. For example, CSA 150 may represent a tubular curtain airbag that extends generally from the headliner front 104 to headliner rear 106 proximate to side 108. In one or more arrangements, CSA 150 may be packaged in different sizes and shapes, and my not extend along the entirety of headliner 102. CSA 150 is shown in a folded or rolled configuration, which represents the condition of CSA 150 prior to deployment. A variety of vehicle control systems may be configured to deploy CSA 150 when an activation event is determined. As used herein, the term "activation event" may include any event in which it is desired for an airbag assembly to deploy. Some examples of activation events may include a collision involving the vehicle, sudden changes in measured acceleration or deceleration of the vehicle or occupants, rollover conditions, and vehicle component failure. Known automotive systems may send signals to an airbag assembly upon the sensing of an activation event.

CSA 150 may be designed to rapidly inflate upon deployment to extend along a side of a passenger compartment from near headliner side 108. In one or more arrangements and described with more detail in reference to FIG. 4 below, CSA 150 may tear through or displace edge portions of headliner 102. Such deployment may exert forces on one or more support structures within headliner assembly 100.

In one or more arrangements, headliner assembly 100 includes one or more side rail stiffeners 200 operatively connected to headliner 102. Side rail stiffener 200 may be located near sides 108 of headliner 102, and may generally extend in a direction from front 104 to rear 106 of the headliner. While side rail stiffener 200 is described with reference to the Figures having particular characteristics, designs herein may be used with several different stiffener designs, shapes, materials and locations. For example, the term "side rail stiffener" may be used to describe any structure that may extend outward from the outer surface 116 of headliner 102 that may receive direct or indirect forces during deployment of a safety device.

In one or more arrangements, moon roof stiffener 300 may be included in headliner assembly 100 and may be operatively connected to headliner 102 near the moon roof aperture 110. For example, moon roof stiffener 300 may be attached to headliner 102 along a side portion of moon roof perimeter 112, extending in a front-to-rear direction. While side moon roof stiffener 300 is described with reference to the Figures having particular characteristics, designs herein may be used with several different stiffener designs, shapes, materials and locations. For example, the term "moon roof stiffener" may be used to describe any structure that may extend outward from the outer surface 116 of headliner 102 near a moon roof aperture 110 of headliner 102.

Figure 2:
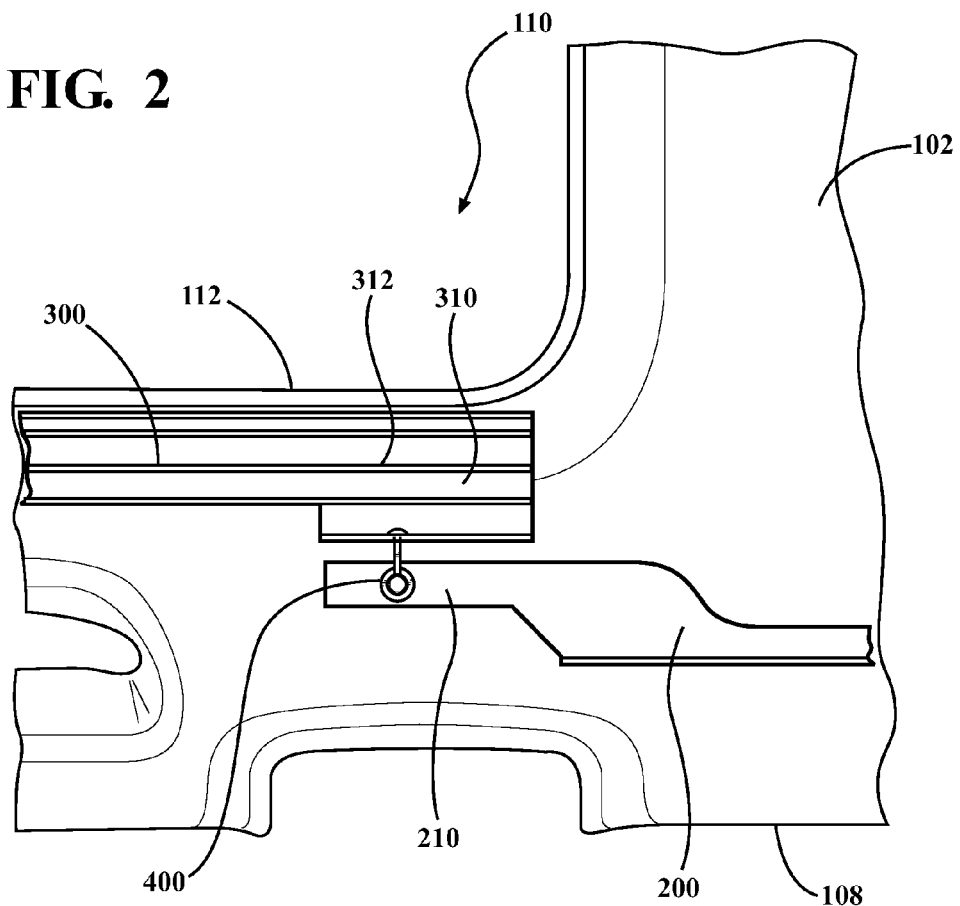
FIG. 2 is an enlarged top perspective view of a portion of the headliner assembly of FIG. 1, showing a tether engaging multiple stiffeners.

FIG. 2 shows an enlarged top perspective view of a portion of the headliner assembly 100 with tether 400 engaging side rail stiffener 200 and moon roof stiffener 300. In one or more arrangements, side rail stiffener 200 may have a front portion 210 that is positioned near a rear portion of moon roof stiffener 300. As shown in FIGS. 2 and 4, front portion 210 and rear portion may extend near each other on headliner 102. For example, portions of each may extend substantially parallel to each other, in substantially front-to-rear directions.

With reference to FIG. 4, some arrangements of stiffeners 200/300 may be described. In some embodiments, side rail stiffener 200 may include one or more sides 212 that extend outward from outer surface 116 of headliner 102. Sides 212 may extend outwards to a top portion 214 of side rail stiffener 200. FIG. 4 shows sides 212 extending approximately vertical and top portion 214 approximately horizontal, but other orientations are contemplated. Top portion 214 may include one or more apertures to receive tether 400.

In one or more arrangements, moon roof stiffener 300 may include a base 310 and one or more sides 312. For example, moon roof stiffer 300 may have base 310 with a plurality of sides 312 extending outward forming ribs. FIG. 4 shows sides 312 extending approximately vertical, but other orientations are contemplated. Sides 312 may include outer side 312a that may include one or more apertures or slots to engage with tether 400.

As mentioned earlier, stiffeners 200/300 may be manufactured from a variety of materials. In some arrangements, one or more stiffeners may be made from materials such as foam, polymers, metals, or composites. Stiffeners may be attached to headliner 102 directly or indirectly in any desired fashion, such as the use of adhesives, mechanical fasteners, or magnetically. For example, stiffeners may be manufactured from a polymer material and attached to outer surface 116 of headliner 102 via polyolefin adhesive.

Figure 3:
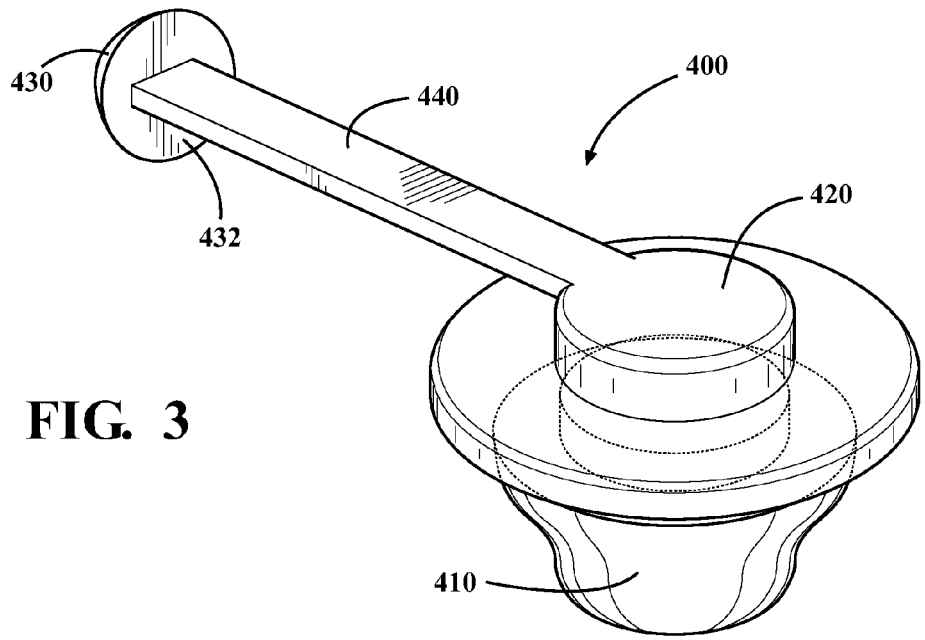
FIG. 3 is a perspective view of an exemplary tether for use in the headliner assembly of FIG. 1.

Some embodiments of tether 400 may be described with greater detail in reference to FIGS. 3 and 4. As shown, tether 400 may include a first end 410, a middle portion 420, a second end 430, and connector 440. In some arrangements, first end 410 is designed to engage a first stiffener portion and second end 430 is designed to engage a second stiffener portion. For example, first end 410 may be configured to engage a portion of side rail stiffener 200 while second end 430 is configured to engage a portion of moon roof stiffener 300.

In one or more arrangements, first end 410 may be designed to extend at least partially through an aperture defined in top 214 of side rail stiffener 200. For example, a portion of first end 410 may be retained in an area between headliner 102 and top 214. First end 410 may include a first surface 422 adapted to abut or contact an outer surface of top 214, and a second surface 424 adapted to abut or contact an inside surface of top 214 when tether 400 is engaged with side rail stiffener 200. Thus, first end 410 may be said to include a channel that receives a portion of top 214 when tether 400 is attached. While arrangements are shown having first end 410 extending through an aperture in side rail stiffener 200, other attachment methods are contemplated, such as the use of adhesives, mechanical fasteners, or magnets.

In one or more arrangements, second end 430 may be designed to extend at least partially through an aperture or slot defined in outer side 312a of moon roof stiffener 300. For example, second end 430 may extend from connector 440 to a wider end. Second end 430 may have retaining surfaces 432 located on one or more sides of connector 440 as shown. In one or more arrangements, second end 430 may be inserted through an aperture or slot in moon roof stiffener such that retaining surfaces 432 may contact outer side 312a. For example, retaining surfaces 432 may be designed to contact a surface of outer side 312a that faces away from first end 410 of tether 400 when a force is applied to connector 440 in a direction towards first end 410. While arrangements are shown having second end 430 extending through an aperture in moon roof stiffener 300, other attachment methods are contemplated, such as the use of adhesives, mechanical fasteners, or magnets.

Tether 400 may be made from a variety of materials. In one or more arrangements, tether 400 may manufactured from polymer based materials. In some embodiments, tether 400 may be a composite of more than one material having different properties. For example, first end 410 may be manufactured from different material than second end 430. First end 410 may be comprised of a softer material such as rubber, while second end 430 may be a harder material such as plastic. In some arrangements, different portions of tether 400 may be flexible, pliable, or bendable to aid in the attachment of first or second ends 410/430.

As shown in FIG. 4, some embodiments of tether 400 may allow for headliner assembly 100 to meet packaging constraints in directions outward from outer surface 116. In one or more arrangements, sides 212 of the side rail stiffener 200 may extend to an approximate height of $h_1$. Sides 312 of the moon roof stiffener 300 may extend to a height $h_2$, wherein height $h_2$ is greater than height $h_1$. When installed, tether 400 may have a height $h_t$ that may be measured to a top surface of middle portion 420 or connector 440. In such exemplary embodiments, tether 400 does not extend beyond height $h_2$ of the moon roof stiffener 300, which may allow for installation of headliner assembly 100 without contact or clearance issues with vehicle structure. Heights $h_1$, $h_2$, and $h_t$ are simply for exemplary purposes to generally show distances stiffeners 200/300 and tether 400 extend away from headliner 102. It is to be appreciated that tether 400 and stiffeners 200/300 may be designed for particular applications along with the particular packaging, strength, and durability requirements.

As shown in FIG. 4, CSA 150 may deploy and exert forces on one or more headliner structures in a deployment force path. As used herein, the term "deployment force path" may mean any area that directly or indirectly is subjected to forces by a deploying airbag. In some embodiments, support structure may be directly impacted by CSA 150 during deployment. In other arrangements, support structure may be subject to forces when CSA 150 contacts other vehicle structure, such as headliner 102. For example, CSA 150 may travel in a direction of arrow B and impact side rail stiffener 200 or headliner 102. Such forces may fracture or break off portions of side rail stiffener 200 or moon roof stiffener 300. For example, front portion of side rail stiffener 200 may be broken off during deployment, both from other portions of the same stiffener and from headliner 102. Tether 400 may retain a broken portion, or reduce the travel of the broken portion into the passenger compartment of a vehicle.

Headliner assemblies described herein may be manufactured, assembled, and installed through a variety of methods. In one or more arrangements, tether 400 may be attached to side rail stiffener and moon roof stiffener 200/300 either before or after the stiffener is attached to headliner 102. For example, second end 430 of tether 400 may be attached to the moon roof stiffener 300, moon roof stiffener 300 may be attached to headliner 102, side rail stiffener 200 may be attached to headliner 102, and then first end 410 may be attached to side rail stiffener 200.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A headliner assembly comprising:
   a headliner configured for attachment within a vehicle interior;
   a first stiffener operatively connected to an outer surface of the headliner, the first stiffener having a top portion spaced a first distance away from the outer surface of the headliner;
   a second stiffener operatively connected to the outer surface of the headliner, the second stiffener having a base and a plurality of sides extending in an outward direction away from the base and the headliner; and
   a tether having a first and a second end, the first end operatively connected to the top portion of the first stiffener and the second end operatively connected to at least one side of the plurality of sides of the second stiffener.

2. The headliner assembly of claim 1, wherein the second stiffener is located between the first stiffener and a moon roof aperture defined in the headliner.

3. The headliner assembly of claim 1, wherein the second stiffener extends a second distance away from the outer surface, the second distance being equal to or greater than the first distance.

4. The headliner assembly of claim 3, wherein a maximum distance of the tether from the outer surface is less than or equal to the second distance.

5. The headliner assembly of claim 1, wherein the first end is orientated at an angle relative to the second end.

6. The headliner assembly of claim 5, wherein the angle is substantially 90 degrees.

7. A headliner system comprising:
   a headliner configured for attachment within a vehicle interior;
   an airbag operatively positioned relative to the headliner;
   a first stiffener operatively connected to an outer surface of the headliner, the first stiffener having a top portion spaced a first distance away from the outer surface of the headliner;
   a second stiffener operatively connected to the outer surface of the headliner, the second stiffener having a base and a plurality of sides extending in an outward direction away from the base and the headliner; and
   a tether having a first and a second end, the first end operatively connected to the top portion of the first stiffener and the second end operatively connected to at least one side of the plurality of sides of the second stiffener.

8. The headliner system of claim 7, wherein the first stiffener comprises a side rail stiffener located along a side of the headliner.

9. The headliner system of claim 8, wherein the second stiffener comprises a moon roof stiffener located between a moon roof aperture defined in the headliner and the side rail stiffener.

10. The headliner system of claim 8, wherein the first end includes a channel, a portion of the first end being received in an aperture defined in the side rail stiffener such that a portion of the side rail stiffener is received in the channel.

11. The headliner system of claim 7, wherein the second stiffener extends a second distance away from the outer surface, the second distance being greater than a the first distance.

12. The headliner system of claim 7, wherein at least one of the first or second stiffeners is located in a deployment force path of the airbag.

13. The headliner assembly of claim 1, wherein the plurality of sides of the second stiffener includes a plurality of substantially parallel ribs, and the second end of the tether is configured for engagement with a rib positioned nearest to the first stiffener.

14. The headliner assembly of claim 1, wherein the first stiffener is a side rail stiffener located along a side of the headliner.

15. The headliner assembly of claim 14, wherein the second stiffener is a moon roof stiffener located between a moon roof aperture defined in the headliner and the side rail stiffener.

16. The headliner assembly of claim 15, wherein the top portion of the side rail stiffener is oriented substantially perpendicular to the at least one side of the plurality of sides of the stiffener.

17. A headliner system comprising:
   a headliner configured for attachment within a vehicle interior having an inner and outer surface, the headliner defining a moon roof aperture;
   a curtain side airbag operatively positioned relative to the headliner;
   a side rail stiffener operatively connected to the headliner, the side rail stiffener having a top portion spaced a first distance away from the outer surface of the headliner;
   a moon roof stiffener operatively connected to the headliner located between the moon roof aperture and the side rail stiffener, the moon roof stiffener having a base and a plurality of sides extending in an outward direction away from the base and the headliner; and
   a tether having a first and a second end, the first end operatively connected to the top portion of the side rail stiffener and the second end operatively connected to at least one side of the plurality of sides of the moon roof stiffener.

18. The headliner assembly of claim 15, wherein the first end includes a channel, a portion of the first end being received in an aperture defined in the side rail stiffener such that a portion of the side rail stiffener is received in the channel.

19. The headliner system of claim 17, wherein the top portion of the side rail stiffener is orientated substantially perpendicular to the at least one side of the plurality of sides of the moon roof stiffener.

20. The headliner system of claim 17, wherein one of the side rail stiffener or moon roof stiffener is located in a deployment force path of the curtain side airbag.

* * * * *